US006758111B2

(12) United States Patent
Buonauro

(10) Patent No.: US 6,758,111 B2
(45) Date of Patent: Jul. 6, 2004

(54) CONTINUOUSLY VARIABLE TRANSMISSION

(76) Inventor: Richard T. Buonauro, 4592 Apricot Rd., Simi Valley, CA (US) 93063

( * ) Notice: Subject to any disclaimer, the term of this patent is extended or adjusted under 35 U.S.C. 154(b) by 0 days.

(21) Appl. No.: 09/771,204

(22) Filed: Jan. 26, 2001

(65) Prior Publication Data

US 2002/0100340 A1 Aug. 1, 2002

(51) Int. Cl.[7] ............................................. F16H 29/08
(52) U.S. Cl. ........................................... 74/119; 74/143
(58) Field of Search ........................... 74/112, 116, 117, 74/118, 119, 122, 123, 124, 125, 125.5, 126, 141.5, 142, 143, 40, 42, 43, 44

(56) References Cited

U.S. PATENT DOCUMENTS

| | | | | | |
|---|---|---|---|---|---|
| 1,045,582 | A | * | 11/1912 | Messer | 74/119 |
| 1,426,358 | A | * | 8/1922 | Chapuy et al. | 74/124 |
| 1,700,562 | A | * | 1/1929 | Doll | 74/119 |
| 1,911,156 | A | * | 5/1933 | Laing | 74/119 |
| 2,109,174 | A | * | 2/1938 | Kalko | 74/119 |
| 2,618,981 | A | * | 11/1952 | Przybylski | 74/116 |
| 2,692,510 | A | * | 10/1954 | Gille | 74/116 |
| 2,864,259 | A | * | 12/1958 | Troeger | 74/113 |
| 2,997,888 | A | * | 8/1961 | Rust, Jr. | 74/119 |
| 3,673,879 | A | * | 7/1972 | Plate et al. | 74/125.5 |
| 4,112,778 | A | * | 9/1978 | Korosue | 74/117 |
| 4,433,594 | A | | 2/1984 | Smirl | |
| 4,565,105 | A | * | 1/1986 | Peterson | 74/119 |

(List continued on next page.)

FOREIGN PATENT DOCUMENTS

| | | | |
|---|---|---|---|
| EP | 1 046 837 | * 10/2000 | |
| NO | 55989 | * 12/1935 | 74/119 |

OTHER PUBLICATIONS

Warner Electric/Dana Corp.; *Warner, Fromsprag and Stieber: Overrunning, Indexing, Backstopping Clutches*; Company Catalog; Copyright 1998; pp. 2–7, 30–31.

(List continued on next page.)

*Primary Examiner*—William C. Joyce
(74) *Attorney, Agent, or Firm*—Fulwider Patton Lee & Utecht, LLP

(57) ABSTRACT

A continuously variable transmission comprising a lay shaft that rotates in response to the input power from the engine. A crank on the lay shaft and a drive rod translate the rotation of the lay shaft into linear motion. An output rod rotatably mounted at a transmission shaft translates the linear motion of the drive rod into rotational motion. A one-way clutch interconnects the output rod with the transmission shaft so that rotational motion of the output rod in one direction is coupled to the transmission shaft to rotate it while rotational motion of the output rod in a second direction is not coupled to the transmission shaft. The distal end of the drive rod is linked to the output rod at a selectable location along the output rod to control the speed of the output rod and hence the transmission shaft. The controllable linkage position therefore also controls the ratio of the transmission from input power to output power. Two such transmissions are coupled together with the output shaft of the first forming the lay shaft of the second providing a greater ratio of input power to output power. Each transmission may have a plurality of cranks, drive rods, output rods, and one-way clutches.

10 Claims, 10 Drawing Sheets

U.S. PATENT DOCUMENTS

| | | | |
|---|---|---|---|
| 4,617,004 A | | 10/1986 | Mott |
| 4,627,308 A | | 12/1986 | Moroto et al. |
| 4,630,504 A | | 12/1986 | Smirl |
| 4,824,419 A | | 4/1989 | Kumm |
| 5,392,664 A | | 2/1995 | Gogins |
| 5,564,998 A | | 10/1996 | Fellows |
| 5,566,577 A | * | 10/1996 | Klar .............................. 74/42 |
| 5,846,152 A | | 12/1998 | Taniguchi et al. |
| 5,885,185 A | | 3/1999 | Kidokoro et al. |
| 5,961,418 A | | 10/1999 | Taniguchi et al. |
| 6,131,474 A | * | 10/2000 | Powell, Jr. ..................... 74/42 |

OTHER PUBLICATIONS

Toboldt, William K.; *Automative Encyclopedia: Fundamental Principles, Operation, Construction, Service, and Repair*; 1995; pp. 466–467.

James E. Duffy and Chris Johanson; *Auto Drive Trains Technology: Principles, Diagnosis, and Service for all Major Types of Drive Trains*; 1995; pp. 241, 254–256, 501–502.

Stockel, Martin W.; *Auto Fundamentals: How and Why of the Design*; 1996; pp. 295, 380.

* cited by examiner

CONTINUOUSLY VARIABLE TRANSMISSION

BACKGROUND

The invention relates to a transmission, and more particularly, relates to a transmission that transmits mechanical power from a power source to a transmission shaft with a continuously variable speed ratio.

Manual transmissions and automatic transmissions for use in wheeled vehicles have been well known for many years. The need to control the power reaching the wheels of a vehicle generated by an engine having a limited range of rotational energy occurs in almost every vehicle having wheels. The need to interject controllable gearing between the engine and the wheels has been found necessary to provide the operator with a reasonable vehicle speed range. The present speed, the orientation, and the weight of a vehicle all contribute to the need to more precisely control the amount of power applied to the wheels to obtain a desired speed of the vehicle. As is well known, a heavy stationary vehicle needs a lower gear ratio to obtain movement than does a light vehicle. Many factors contribute to the need to use different gearing including the above three.

Manual shift transmissions are provided in which five or more forward gears can be manually selected by the operator for more precise control over the transmission of engine power to the wheels. Automatic shift transmissions typically provide fewer forward gears than manual shift transmissions but by virtue of separate gears, still provide control over the transmission of power to the wheels. However, in both of these transmission types, discrete gears are used with each gear providing a preselected gear ratio that cannot be changed. These discrete gearing arrangements require that the engine speed be controllable so that the speed of the vehicle can be more precisely controlled.

It has been found that each engine has a particular rotational speed range within which it operates most efficiently. That is, its power output and fuel efficiency are both high at this particular engine rotational speed range, which is typically a higher rate of speed. While it would be desirable to constantly operate the engine within this most efficient engine speed range and merely vary the gearing to enable the vehicle to operate over a large vehicle speed range, such technique is not possible with present discrete geared transmissions. Because of the relatively large separation between adjacent gears, engine speed can vary by over one thousand revolutions per minute ("RPM") as gears are changed, and in some cases much more. In many cases, part of the engine speed range traversed during acceleration and deceleration through the discrete gears includes less efficient engine speeds where fuel efficiency decreases as well as torque and horsepower being degraded in comparison to other engine speeds. Additionally, gears typically have such a large separation that shifting up into a higher gear will undesirably lug the engine unless the engine rotational speed is sufficiently higher. At the same time, increasing the engine speed too high can overspeed and damage the engine. Thus, the operator must constantly be aware of engine speed versus the vehicle speed in order to shift at the appropriate times with a manual shift transmission.

Automatic transmissions have made the process easier, but the operator can still override the automatic shifting process and overspeed the engine causing damage. Additionally, automatic shift transmissions typically, although not always, use fewer forward gears resulting in greater gear ratio separation. In such automatic transmissions, an even greater engine speed range may be traversed than in manual transmissions with a resulting lower fuel efficiency. It would be desirable if engine speed variations were not such a factor in the transmission of power to the drive wheels of the vehicle.

Present transmissions, whether automatic or manual, use discrete gears that interact. When gears in these transmissions are changed, different gears are brought into engagement with each other thereby changing the overall gearing ratio. Large trucks have increased the number of gears to reduce the spacing between the gears; however, there is a practical limit to the number of gears that can be included in a gearbox due to the concomitant size and weight increases that would occur. Vehicle manufacturers continually strive to reduce the weight of the vehicle as it is easier and more fuel efficient to drive a lighter vehicle than a heavier vehicle. Increasing the number of gears of a gearbox to obtain better fuel efficiency can be out balanced by the increase in the weight and size of that gearbox which will actually result in reduced fuel efficiency.

Over many years there have been attempts to provide a continuously variable transmission ("CVT"). Such a transmission permits the engine to be set at an optimum rotational speed for horsepower, torque, and fuel efficiency while the gear ratio in the transmission is varied to control the vehicle speed. The concept is attractive in that the engine speed remains fairly constant while the transmission is shifted through its continuously variable speeds to obtain the desired speed of the vehicle. For example, when starting out, the gearshift or transmission lever is first set at a low gear ratio and is advanced through higher gear ratios until the desired vehicle speed is obtained. If the ratio is too high, the engine will lug and the vehicle speed will drop. The transmission lever is then moved to a lower gear ratio until the vehicle speed increases again to the desired speed. The same occurs when going up a hill. The vehicle will slow down going up the hill and the transmission lever must be moved to a lower gear ratio to maintain the desired speed.

However, very few CVT arrangements have proven successful. Previous versions of CVT's use some type of friction method to control the variable aspect of the transmission which has not been perfected to deliver large amounts of torque and power. In some cases, rubberized steel belts have been used in the CVT. The rubber surface provides the necessary friction to transmit the drive energy while the embedded steel results in stability and a longer life for the belt. While such an approach has been found to be useful in lighter and smaller vehicles, the need to replace the belt at intervals is undesirable. Additionally, such configuration has not proved to be useful in larger vehicles where increased amounts of power are needed. It has been found that the belt has been unable to handle the higher amounts of power put out by larger engines. The belt will slip and wear prematurely. Other approaches, such as toroidal mechanisms, have been tried, but also with only limited success. Demands for more efficient fuel consumption as well as improvements in speed control over vehicles keep an interest alive in developing a continuously variable transmission.

Hence, those skilled in the art have recognized a need for an improved transmission that permits more variability in the gearing ratio without the use of discrete gears. A need has also been recognized for an improved transmission that permits engine speed to remain within an abbreviated range while a wide range of gearing ratios is provided by the transmission. The present invention fulfills these needs and others.

BRIEF SUMMARY OF THE INVENTION

Briefly and in general terms, the present invention is directed to a continuously variable transmission having a continuously variable ratio from input to output. In one aspect, the continuously variable transmission receives input power and transmits that power, and comprises a lay shaft that rotates in response to the input power, a first translation device that translates the rotation of the lay shaft into linear motion, a second translation device having a plurality of linkage locations, the second translation device translating the linear motion received from the first translation device at a selected linkage location into translated rotational motion, the speed of the translated rotational motion being dependent on the linkage location selected, and a transmission shaft that rotates in response to the translated rotational motion. In a more detailed aspect, the continuously variable transmission further comprises a one-way device that couples translated rotational motion in a first direction provided by the second translation device to the transmission shaft thereby causing rotation of the transmission shaft. And in yet a further more detailed aspect, the second translation device translates the linear motion received from the first translation device into translated rotational motion of a first and a second direction. A more detailed aspect includes the one-way device coupling only the translated rotational motion of the first direction provided by the second translation device to the transmission shaft. A yet more detailed aspect in accordance with the invention comprises the continuously variable transmission wherein the one-way device does not couple the rotational motion of the second direction provided by the second translation device to the transmission shaft.

In other aspects in accordance with the invention, the first translation device comprises a crank disposed on the lay shaft that rotates with the lay shaft, and a drive rod connected to the crank, the drive rod providing linear motion in response to rotational motion of the crank. A one-way device couples translated rotational motion in a first direction provided by the second translation device to the transmission shaft thereby causing rotation of the transmission shaft wherein the second translation device comprises an output rod mounted to the one-way device and rotatably disposed about the transmission shaft such that the output rod provides translated rotational motion to the one-way device, wherein the one-way device couples rotational motion of the output rod in the first direction to the transmission shaft, and wherein the drive rod is linked to the output rod at the selected location along the output rod, the selected location controlling the speed of rotation of the output rod.

In further aspects in accordance with the invention, the output rod comprises a drive slot within which the drive rod is located to link with the output rod, the plurality of linkage locations of the drive rod to the output rod occurring within the drive slot, wherein the linkage location of the drive rod within the drove slot determining the speed of rotation of the output rod. A speed control device is provided that selects the linkage location at which the drive rod links to the output rod. Additionally, an actuator device controls the position of the speed control device and thereby controls the selection of the linkage location at which the first translation device is linked to the second translation device.

In yet further aspects, the continuously variable transmission further comprises a plurality of one-way devices disposed so as to couple translated rotational motion of a first direction to the transmission shaft to thereby cause the transmission shaft to rotate, wherein the first translation device comprises a plurality of cranks disposed on the lay shaft that rotate with the lay shaft, wherein the first translation device further comprises a plurality of drive rods connected to the cranks, the drive rods providing linear motion in response to rotational motion of the cranks, wherein the second translation device comprises a plurality of output rods mounted to a plurality of one-way devices, the output rods also rotatably disposed about the transmission shaft, the output rods providing the translated rotational motion, wherein the one-way devices couple the translated rotational motion of the output rods of the first direction to the transmission shaft, and wherein the drive rods are linked to the output rods at selected locations along the output rods, the selected locations controlling the speed of rotation of the output rods. In more detailed aspects, the continuously variable transmission further comprises a speed control device that selects the linkage locations at which the drive rods link to the output rods.

In accordance with the invention, other aspects include a continuously variable transmission 1 further comprising a second lay shaft coupled to the transmission shaft such that the second lay shaft rotates with rotation of the transmission shaft, a third translation device that translates the rotation of the second lay shaft into linear motion, a fourth translation device having a plurality of linkage locations, the fourth translation device translating the linear motion received from the third translation device at a selected linkage location into second translated rotational motion, the speed of the second translated rotational motion being dependent on the linkage position selected on the fourth translation device, a second transmission shaft that rotates in response to rotational motion, and a second one-way device that couples the second translated rotational motion provided by the fourth translation device to the second transmission shaft thereby causing rotation of the second transmission shaft. In a more detailed aspect, the transmission shaft and the second lay shaft are formed of the same shaft.

In accordance with aspects of the invention, there is provided a method of transmitting input power with a continuously variable ratio of input power to output power, comprising rotating a lay shaft in response to the input power, translating the rotational motion of the lay shaft into linear drive motion, translating the linear drive motion into a rotational drive motion, controlling the ratio of the rotational drive motion to the rotation of the lay shaft during the step of translating the linear drive motion into rotational drive motion, and applying the rotational drive motion occurring in a first direction to a transmission shaft thereby causing the transmission shaft to rotate and provide output power. In more detailed aspects, the method further comprises varying the ratio of the rotational drive motion to the rotation of the lay shaft during the step of translating the linear drive motion into rotational drive motion to provide continuously variable output power. The method further comprises rotating a second lay shaft in response to rotation of the transmission shaft, translating the rotational motion of the second lay shaft into second linear drive motion, translating the second linear drive motion into a second rotational drive motion, controlling the ratio of the second rotational drive motion to the rotation of the second lay shaft during the step of translating the second linear drive motion into second rotational drive motion, and applying the second rotational drive motion occurring in a first direction to a second transmission shaft thereby causing the second transmission shaft to rotate and provide output power.

Other features and advantages of the invention will become apparent from the following detailed description, taken in conjunction with the accompanying drawings, which illustrate, by way of example, the features of the invention.

DESCRIPTION OF THE PREFERRED EMBODIMENTS

Figure 1:
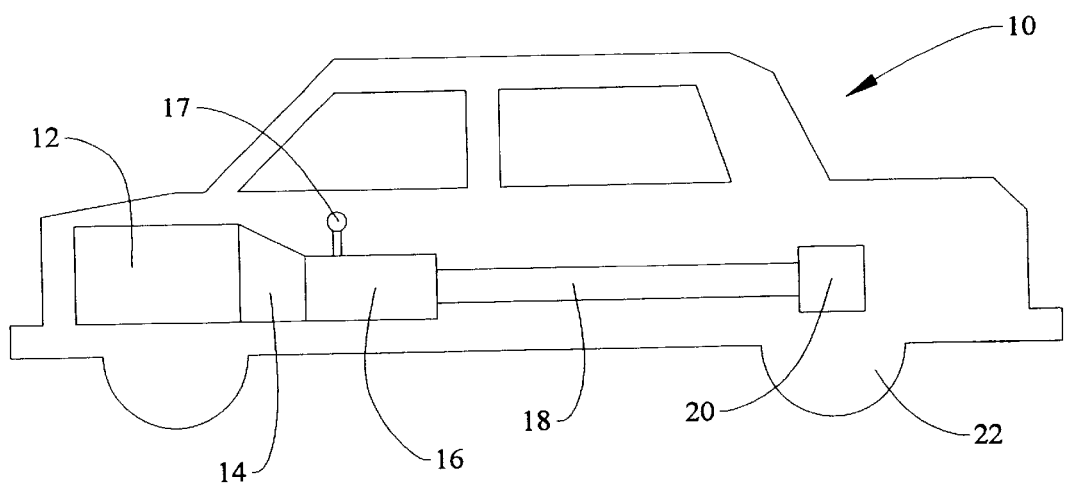
FIG. 1 is a block diagram view of the location of a CVT in the drive system of a rear-wheel drive vehicle showing an engine, a torque converter, the CVT, a drive shaft, a differential, and the drive wheels.

Referring now to the drawings with more particularity, wherein like reference numerals designate like or corresponding elements among the several views, there is shown in FIG. 1 a rear-wheel drive vehicle 10 having a rotational power source 12, which may comprise a gasoline engine, diesel engine, electric motor, or other. A clutch or torque converter 14 is connected to the power source 12, and to that is connected a continuously variable transmission ("CVT") 16 in accordance with aspects of the invention. A gear shift lever 17 is connected to the CVT to control the gear ratio provided by the CVT. Further drive train components are connected to the CVT and comprise a drive shaft 18, a differential 20, axles (not shown), and wheels 22. Other configurations are also possible, such as a front wheel drive configuration, placement of the engine in the rear of the vehicle, or others.

The CVT 16 transmits the rotational energy developed by the power source 12 to the rear wheels 22 in a controllable fashion. The clutch or torque converter 14 provides for the smooth application of power to the CVT while the differential 20 redirects at ninety degree angles the rotational power from the drive shaft 18 to the rear wheels 22. Details of the engine 12, clutch or torque converter 14, drive shaft 18, and differential 20 are not provided here as they are all well known components of a vehicle.

Figure 2:
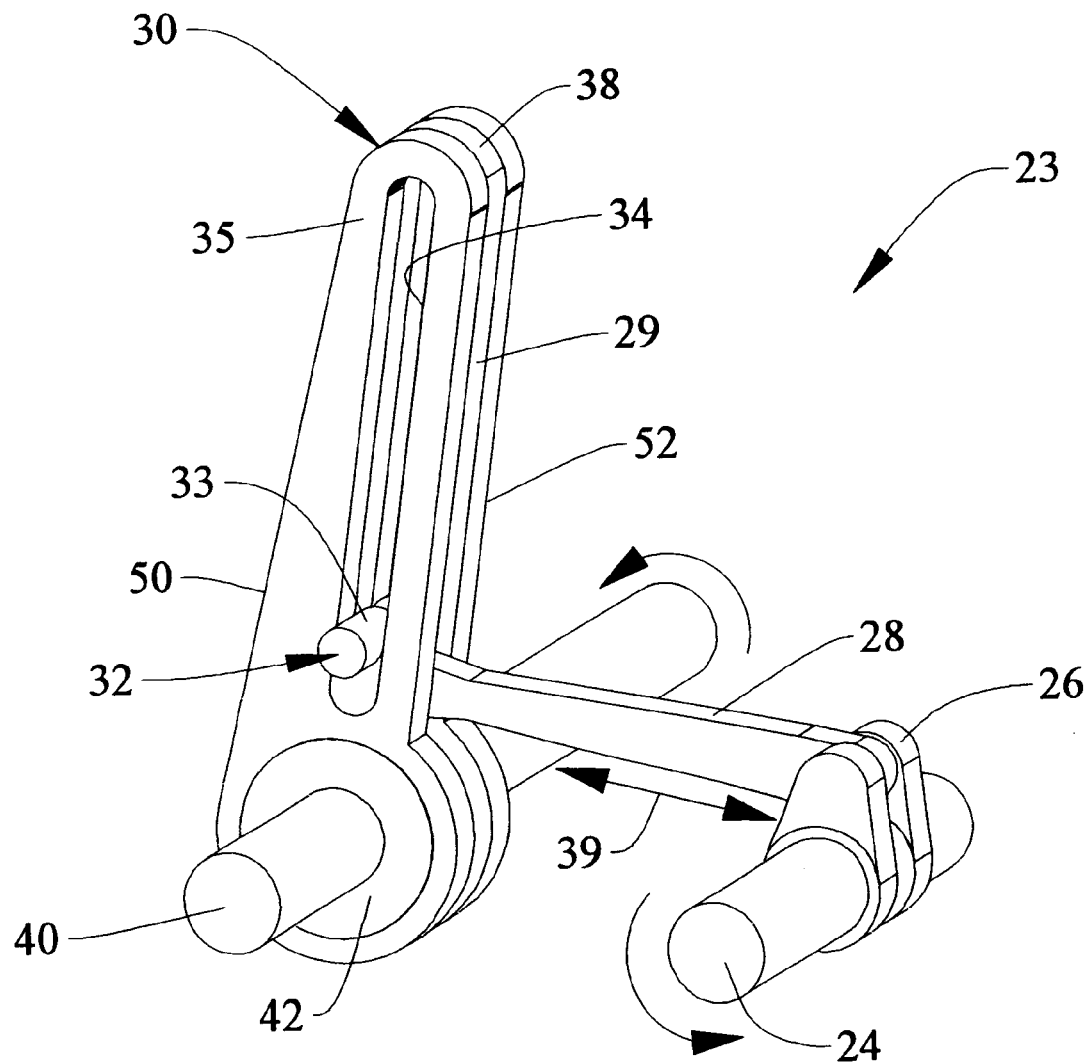
FIG. 2 presents the use of a drive rod connected to a crank to translate the rotational motion of the crank substantially into linear motion, and an output rod and one-way clutch mechanism to translate the linear motion of the drive rod into rotational motion of a transmission shaft. Also shown is a speed control slot in the output rod for use in adjusting the linkage location of the drive rod with the output rod to control the rotational speed of the transmission shaft.

Turning now to FIG. 2, one working embodiment of a CVT 23 in accordance with aspects of the invention is shown. A lay shaft 24 includes a crank 26 that is coupled to a drive rod 28. In typical crankshaft fashion, the crank is offset from the centerline of the lay shaft 24 but rotates with the lay shaft. The drive rod 28 extends from the crank into an elongated drive slot 29 of an output rod 30. A drive pin 32 is disposed at the end of the drive rod 28 within the output rod 30 and has two speed control arms 33 extending perpendicularly from the end of the drive rod 28. These speed control arms 33 extend through the elongated speed control slots 34 of the output rod 30 and extend outwardly from the output rod 30 for engagement with a speed control linkage, as will be described and shown subsequently.

The drive rod 28 may be connected with the crank 26 and with the drive pin 32 in ways common in the art. For example, although not shown, the drive rod 28 at the crank end may have a cap that is attached to the body of the drive rod by two screws. When mounting the drive rod to the crank, the drive rod 28 is placed into contact with one side of the crank 26, the cap is then placed on the other side of the crank and screws are inserted through the cap and into the drive rod to capture and hold the crank between the body and the cap, in similar fashion to piston rods in reciprocating engines. In another approach, the crank may comprise a pin that is press fit into position to form the crank. The drive rod 28 may have an opening for capturing the crank pin. The drive rod opening is aligned between the crank arms, the crank pin is inserted through one hole in a crank arm, through the drive rod 28 opening, and then through the other hole in the other crank arm. The press fit of the crank pin in the crank arms retains the crank pin in position. The latter approach is more permanent and makes it more difficult to replace a drive rod 28.

At the drive pin 32 end of the drive rod 28, the drive pin 32 may be press fit into position within a drive rod opening. Other approaches for mounting the drive pin 32 to the drive rod 28 may be employed. Additionally, bearings may be used where appropriate.

Figures 4, 5:
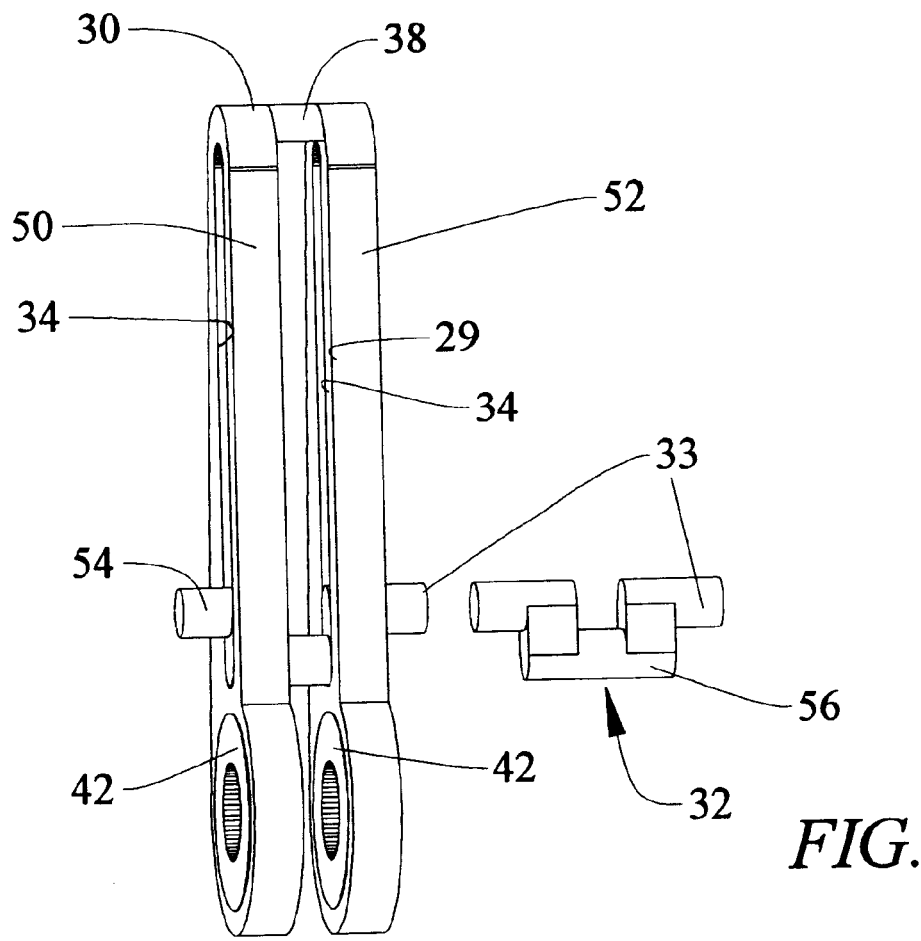
FIG. 4 is a front perspective view of an embodiment of a multiple-piece output rod and shows the speed control slots and the drive rod slot, and also shows the placement of an angled drive pin within the speed control slots.
FIG. 5 is a perspective view of the angled drive pin of FIG. 4 in which the pin has a main coupling shaft portion for connection to a drive rod, and has two coupling arms attached to the main portion in a non-coaxial arrangement, the two coupling arms extending outward for connection with a speed control linkage.

This drive slot 29 of the output rod 30 may be formed by removing material from a solid output rod or by forming the output rod from elongated separate arms 50 and 52 that are joined together with a spacer 38 at their distal ends, such as that shown in FIGS. 2 and 4. The spacer may be formed on one of the arms and may be welded to the other arm, or alternatively, it may be a piece separate from both the first and second arms. It is sandwiched between the first and second arms and all are bolted together, welded together, or interconnected by other means. There may also be included a second spacer at the proximal ends of the arms, not shown.

The drive rod 28 is linked by the drive pin 32 to the output rod 30 and therefore, the drive rod 28 will reciprocate linearly with the rotating movement of the crank 26. This linear reciprocating movement is shown by the two-headed arrow 39. As is apparent from a consideration of FIG. 2 therefore, the rotational motion of the crank 26 is translated into linear motion by the drive rod 28. The combination of the crank and the drive rod therefore form a first translation device that translates the rotational motion of the lay shaft into linear motion.

The output rod 30 is rotatably mounted at the transmission shaft 40 and is connected to the transmission shaft through a one-way device 42 such as a one-way clutch or clutches. Because the drive rod is linked to the output rod 30, the output rod too will reciprocate back and forth with the rotational movement of the crank. Such motion can be seen by reference to FIG. 3. The solid figure shows the position of the output rod when the crank is facing the output rod. The dashed figure shows the position of the output rod 30 when the crank is facing away from the output rod. The output rod 30 reciprocates through an arc 44 between these two extremes as the crank rotates. Therefore, the output rod 30 may be thought of as a second translation device that translates the linear motion of the drive rod, or first translation device, into translated rotational motion. This translated rotational motion is applied to the transmission shaft through the one-way device or devices 42 and the transmission shaft will rotate in response to the translated rotational motion.

As will be discussed and shown in further detail below, the linkage point between the drive rod and the output rod established by the positioning of the drive pin (not shown in FIG. 3) in the speed control slots 34 of the output rod determines the length of the arc 44. The closer the drive pin is to the distal end 46 of the output rod 30, the shorter the arc 44. The closer the drive pin is to the proximal end 48 of the output rod 30, the longer the arc 44 will be. A speed control linkage to the drive pin 32 will be shown and discussed below in detail.

Although not intending to be bound by theory, a brief description of operation is provided. The crank 26 and lay shaft 24 rotate at a speed set by the power source and any intervening devices. Consequently, the drive rod 28 reciprocates and moves linearly a set distance. The speed of rotation of the lay shaft 24 determines the speed of reciprocation of the drive rod. As is well known to those skilled in the art, the circumferential distance of a circular device at its edge is greater than the distance closer to the center. Thus a given distance at the circumference may only encompass an arc of ten degrees while the same given distance taken closer to the center may encompass a forty-five degree arc. Therefore, linking the linearly moving drive rod to the output rod at a point farther from the output rod's pivot point will cause the output rod to move through less of an arc than if the drive rod were linked to the output rod closer to its pivot point. Because the output rod is coupled to the transmission shaft through a one way clutch or clutches, the transmission shaft will rotate in accordance with the arc 44 of movement of the output rod. Therefore, the speed of the transmission shaft will be controlled by the position of linkage of the drive rod to the output rod. The closer the linkage position is to the transmission shaft, the faster the transmission shaft will rotate and the farther the linkage location is, the slower the transmission shaft will rotate per movement of the lay shaft.

Figure 3:
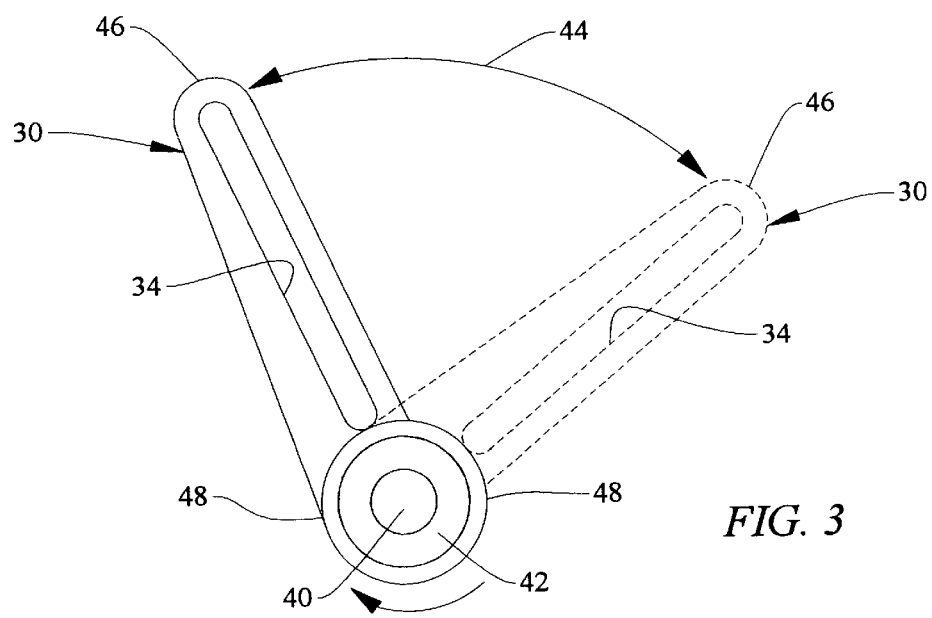
FIG. 3 is a schematic-type diagram of the rotational motion of an output rod connected through a one-way clutch to the transmission shaft wherein the one-way clutch functions to rotate the transmission shaft in only one direction despite the reciprocal motion of the output rod.

As shown in FIGS. 2 and 3, the output rod 30 is mounted to a transmission shaft 40. A straight coupling of the output rod 30 to the transmission shaft 40 would result in nothing more than the transmission shaft rotating in one direction and then the opposite direction (reciprocating) in accordance with the same reciprocal movement of the output rod. This would be a net zero movement. In order to result in net positive rotational motion of the transmission shaft 40, a mechanism is interposed between the output rod 30 and the transmission shaft 40. In this embodiment, a one-way clutch 42 is used to couple the movement of the output rod in a first direction to the transmission shaft to thereby rotate the transmission shaft while decoupling the movement of the output rod in a second direction from the transmission shaft so that such movement of the output rod in the second direction has no effect on the transmission shaft. While a ratchet-type mechanism would perform such a function as described, such mechanisms are generally considered undesirable due to the relatively high noise levels that they provide. Instead, a mechanism known as a one-way clutch is preferred. Such one-way clutches are available from Warner Electric having an address of 449 Gardner Street, South Beloit, Ill. 61080 and having a model number of CSK . . . PP25. Such clutches are also known as overrunning, indexing, or backstopping clutches and use rollers, ramps, or sprags, and springs to achieve one-way rotational motion, as is well known to those skilled in the art. Other mechanisms may also work and the invention is not meant to be limited to any particular type of one-way clutch.

In one embodiment where an overrunning or indexing type of clutch is used, the output rod is attached to the outer race and the inner race is mounted to the transmission shaft 40. Press fits for both outer and inner races are used.

Turning now to FIG. 4, details of a two-piece output rod 30 may be seen. The output rod 30 has first 50 and second 52 arms with a spacer 38 located between the two at their distal ends to form the drive slot 29. A second spacer, not shown, may be used at the proximal ends of the arms 50 and 52.

Details of an angled drive pin 32 are shown in both FIGS. 4 and 5. In this embodiment, the angled drive pin 32 has two speed control arms 33 that protrude through the speed control slots 34 of both arms 50 and 52 of the output rod 30 for use with a speed control linkage, described below and shown in later drawings. The two speed control arms 33 are interconnected with a main shaft portion 56 of the pin 32 that is placed through the drive rod, as shown in FIG. 2. In this angled pin embodiment, the speed control arms extend outward from the main shaft portion but are non-coaxial with the main shaft portion of the pin. The speed control arms are attached to the main shaft portion at the distal ends of the main shaft portion and the angled drive pin 32 takes on the appearance of a crank device. In this embodiment, the drive pin permits the main shaft portion 56 to always be at a point below the arms 33 so that the speed control linkage, which will be described below in more detail, does not hit the one-way clutches. Such one-way clutches will have different widths depending on the horse power rating of the power source driving the wheels. For higher horse power engines, the clutches will be wider and will extend outwardly from the arms of the output rod. In such a case, a straight output pin would cause the speed control mechanism to hit the clutches when the pin is moved to its position closest to the transmission shaft 40.

In the embodiment shown in FIG. 4, each arm 50 and 52 of the output rod 30 is fitted with a separate one-way clutch 42. However, in another embodiment, a single, wider one-way clutch may span both arms thus resulting in one clutch per output rod 30 rather than two clutches shown in FIG. 4. Such an arrangement is more appropriate where the output rod 30 is formed of a single piece of material and the drive slot 29 and speed control slots 34 are machined in later.

Figure 6:
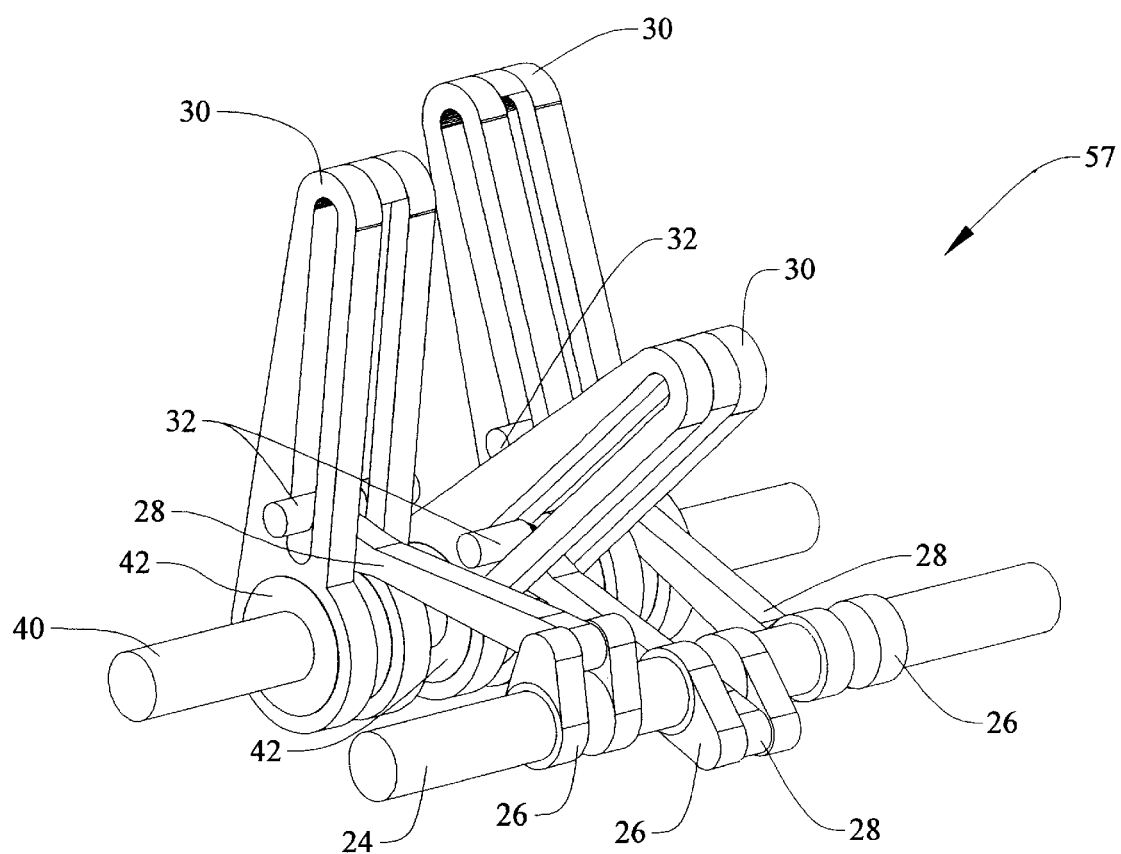
FIG. 6 is a CVT having three cranks on a lay shaft, three drive rods connected to the cranks, the drive rods connected to three output rods by angled drive pins in this embodiment, and one-way clutches connected to the output rods for translating the reciprocal motion of the output rods into one-way rotational motion for rotating the transmission shaft.

Referring now to FIG. 6, a CVT 57 similar to FIG. 2 is shown but with three cranks, three drive rods, three output rods, and associated one-way clutches. The three cranks in this embodiment are offset from one another by 120 degrees. It will be seen that all the components of FIG. 2 also exist in this embodiment but are repeated two additional times. Having three cranks oriented at 120 degrees results in smoother operation and provides constant rotational force to the transmission shaft 40 so that it undergoes continuous rotation.

Figure 7:
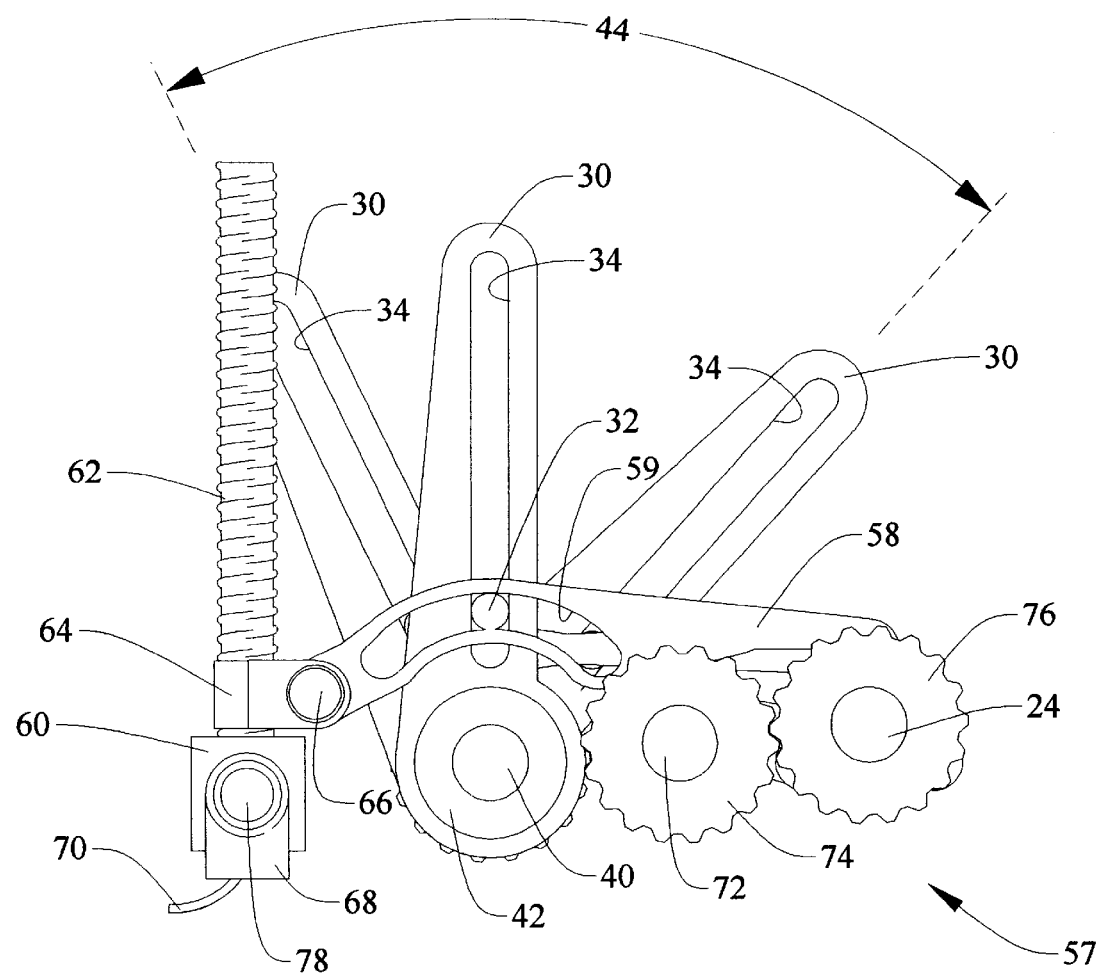
FIG. 7 is a combination of the CVT of FIG. 6 with the addition of a speed control system in which an actuator causes a lead screw to rotate moving a drive head up or down the lead screw, the drive head attached to a speed control linkage to move the drive pins within the speed control slots of the output rods to control the output rotational speed of the CVT, and also showing the drive rods linked to the output rods at the point closest the transmission shaft thereby setting the CVT at the highest speed.
Figure 8:
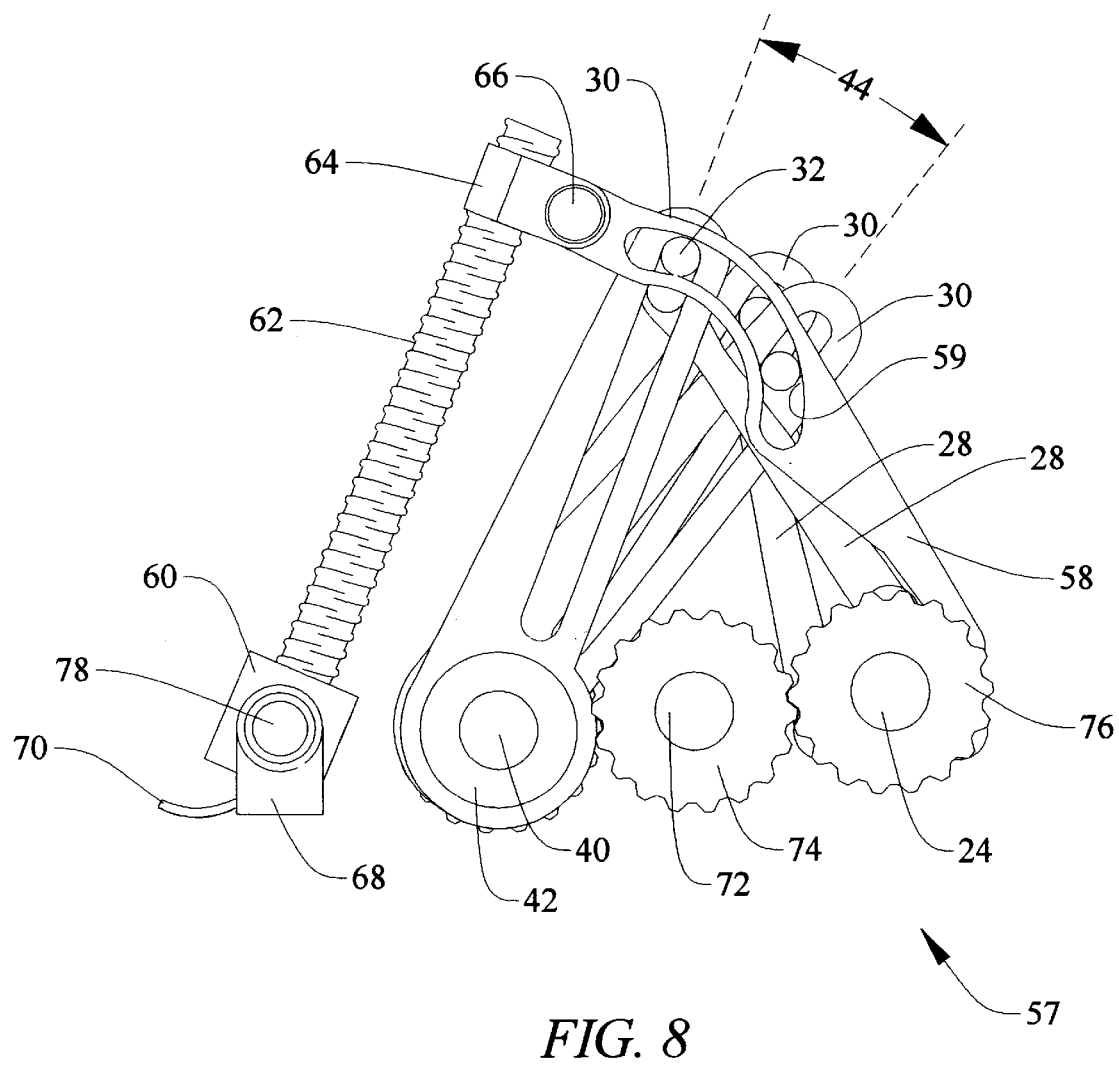
FIG. 8 presents the CVT of FIG. 7 with the drive rods linked to the output rods at a point farthest away from the transmission shaft thereby resulting in the slowest output rotational speed of the transmission shaft.

Referring now to FIGS. 7 and 8, a speed control system is shown applied to the CVT 57 of FIG. 6. A speed control linkage 58 captures the drive pins 32 of the drive rods 28 in slots 59 to control their positions in the speed control slots 34 of their respective output arms 30. An electric or hydraulic actuator 60 is used to rotate a lead screw 62 and is mounted through a pivot pin 78 to allow pivoting movement of the actuator. A driver head 64 is mounted on the lead screw 62 and is positioned along the lead screw by means of rotation of the lead screw itself. The speed control linkage 58 is connected to the driver head 64 through a rotatable linkage pin 66 having a bearing (not shown). The pin 66 and bearing accommodate the pivoting of the linkage 58 that will occur as it is moved up and down the lead screw 62. FIGS. 7 and 8 also show the large difference between the arcs 44 when the drive pins are closer to the transmission shaft 40 (FIG. 7) than then they are positioned at the distal ends of the output arms 30 (FIG. 8). Therefore, when the speed control linkage 58 is located as shown in FIG. 7, the transmission shaft 40 is rotated much more by the rotation of the lay shaft 24 than when the speed control linkage 58 is in the position shown in FIG. 8. Thus, the speed of the transmission shaft 40 is directly controlled by the position of the driver head 64. Also shown in FIGS. 7 and 8 is the electrical connection 68 to an electrical actuator 60, as well as the associated wiring 70. No details of the wiring are provided herein as the wiring of actuators is well known to those skilled in the art.

The speed control linkage 58 is mounted at its other end to the lay shaft 24 in a pivoting arrangement. This will be shown and described in more detail below. Because the output rods 30 are pivotally mounted on the transmission shaft 40, and because the drive pins 32 are kept at fixed positions in their respective output rods as those output rods reciprocate through a movement arc, the output pins will also undergo arc-shaped reciprocal movement. The speed linkage slots 59 are therefore curved to accommodate the arcs of movement of the drive pins 32.

Shown also in FIGS. 7 and 8 is an input shaft 72. The input shaft is connected to the lay shaft 24 through a gear 74 on the input shaft that meshes with a gear 76 on the lay shaft to rotate the lay shaft in accordance with rotation of the input shaft. The input shaft of the CVT may receive its rotation from the engine crankshaft through the clutch or torque converter, as an example, and therefore transmits input power. The lay shaft will therefore rotate in response to the input power.

Figure 9:
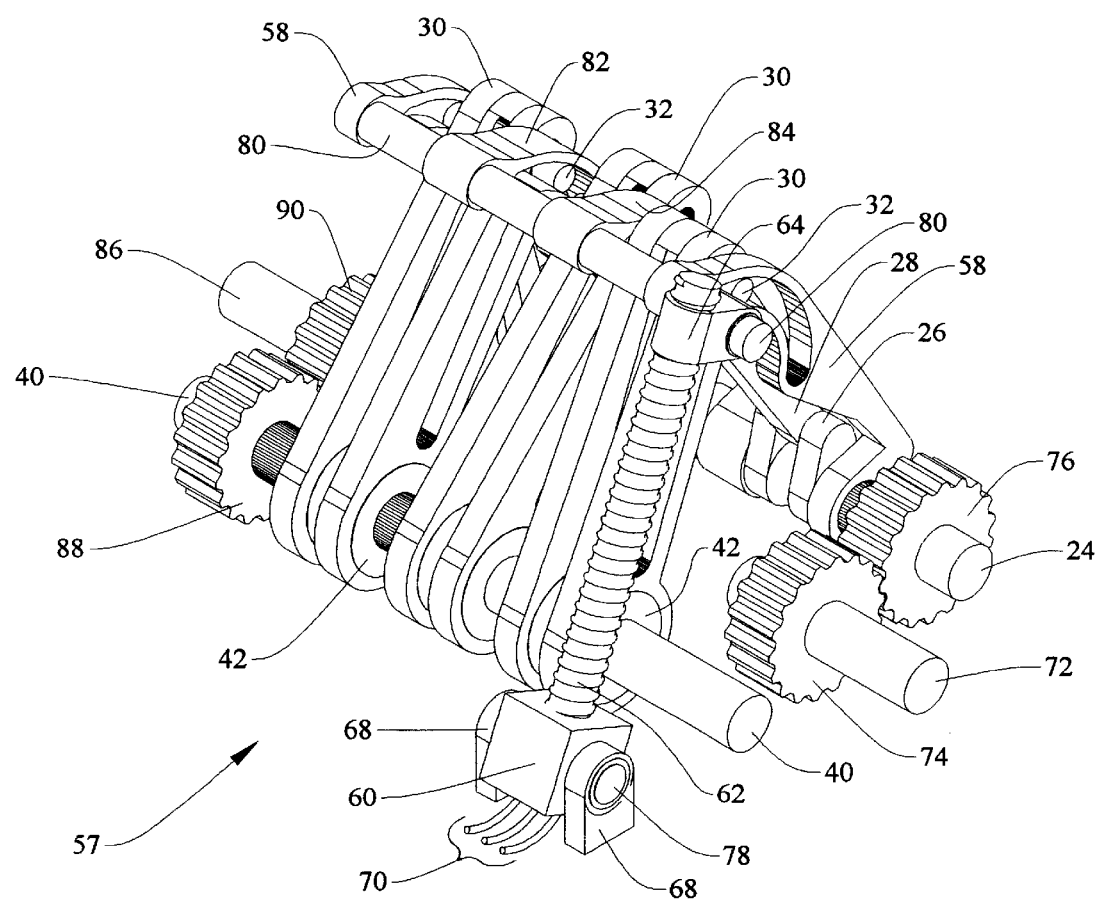
FIG. 9 is a perspective view of the CVT of FIGS. 7 and 8 showing a speed control linkage rod that interconnects all speed control linkages so that a single speed control actuator controls the movement arc of all output rods and thereby controls the speed of the transmission shaft, the figure showing the actuator linking the drive rods at the slowest point on the output rods.
Figure 10:
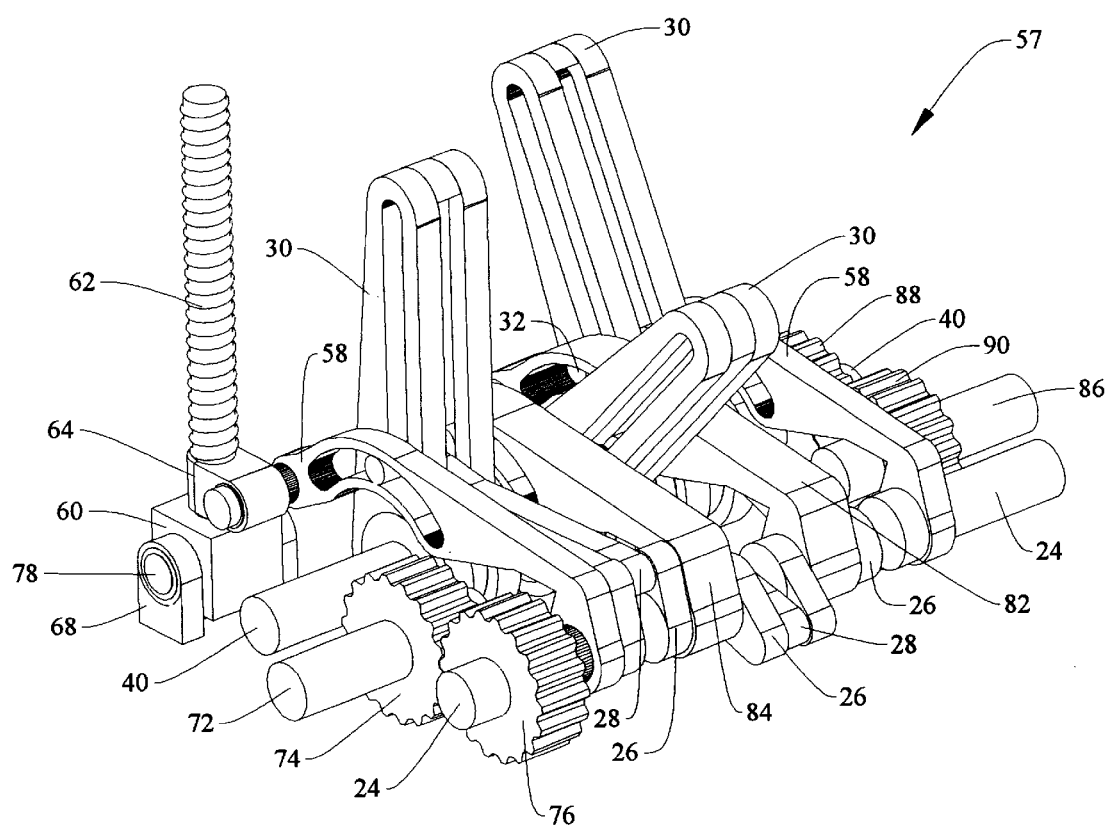
FIG. 10 depicts the same CVT as FIGS. 7 through 9 also shown in a perspective view with the speed control actuator positioning the speed control linkages such that the highest output speed is obtained.

The perspective views of the CVT 57 in FIGS. 9 and 10 present more detail of the speed control system of FIGS. 7 and 8 showing a speed control linkage interconnect rod 80. The rod 80 interconnects all speed control linkages 58 with the driver head 64 so that the drive pins 32 in all output rods 30 are at the same position in their respective output rod. This assures that each output rod 30 will provide the same rotation speed to the transmission shaft 40 and each output rod will traverse the same arc for smoother operation. It will be seen that the center two speed control linkages 82 and 84 are wider than the end speed control linkages 58. This is more apparent from FIG. 10, and results from the center speed control linkages 82 and 84 being configured to accept two drive pins from adjacent output rods. The speed control linkage interconnect rod 80 may be mounted in the driver head 64 so that it is free to rotate as the driver head moves the rod closer to or farther from the transmission shaft 40. The speed control linkage interconnect rod 80 may also be mounted in the speed control linkages so that it is free to rotate as necessary.

It should also be noted that only one embodiment is shown in FIGS. 9 and 10, while other embodiments are possible. As an example, the single lead screw 62 and actuator 60 may be replaced with one set for each speed control linkage 58. Other positioning systems may be used for controlling the position of the speed control linkages 58. Hydraulic systems may be used, as well as other systems such as a direct link to the gear shift lever 17 mounted within reach of the driver of the vehicle.

Also shown in both FIGS. 9 and 10 is an output shaft configuration. The transmission shaft 40 in this embodiment is coupled to an output shaft 86 through a gear 88 located on the transmission shaft 40 that meshes with a gear 90 located on the output shaft. The output shaft may be coupled to the drive shaft for example (not shown) through a universal joint or by other means. With the configuration shown in FIGS. 9 and 10, a compact CVT 57 results with the input shaft 72 being coaxially aligned with the output shaft 86 in a "straight through" arrangement. This permits the CVT 57 to be located along the centerline of the crankshaft of the engine and the drive shaft also located along the centerline. Different configurations are possible with one or both shafts located in other positions. In a front wheel drive application, gears may not be necessary to link the input and output shafts to the CVT and may be omitted.

Figure 11:
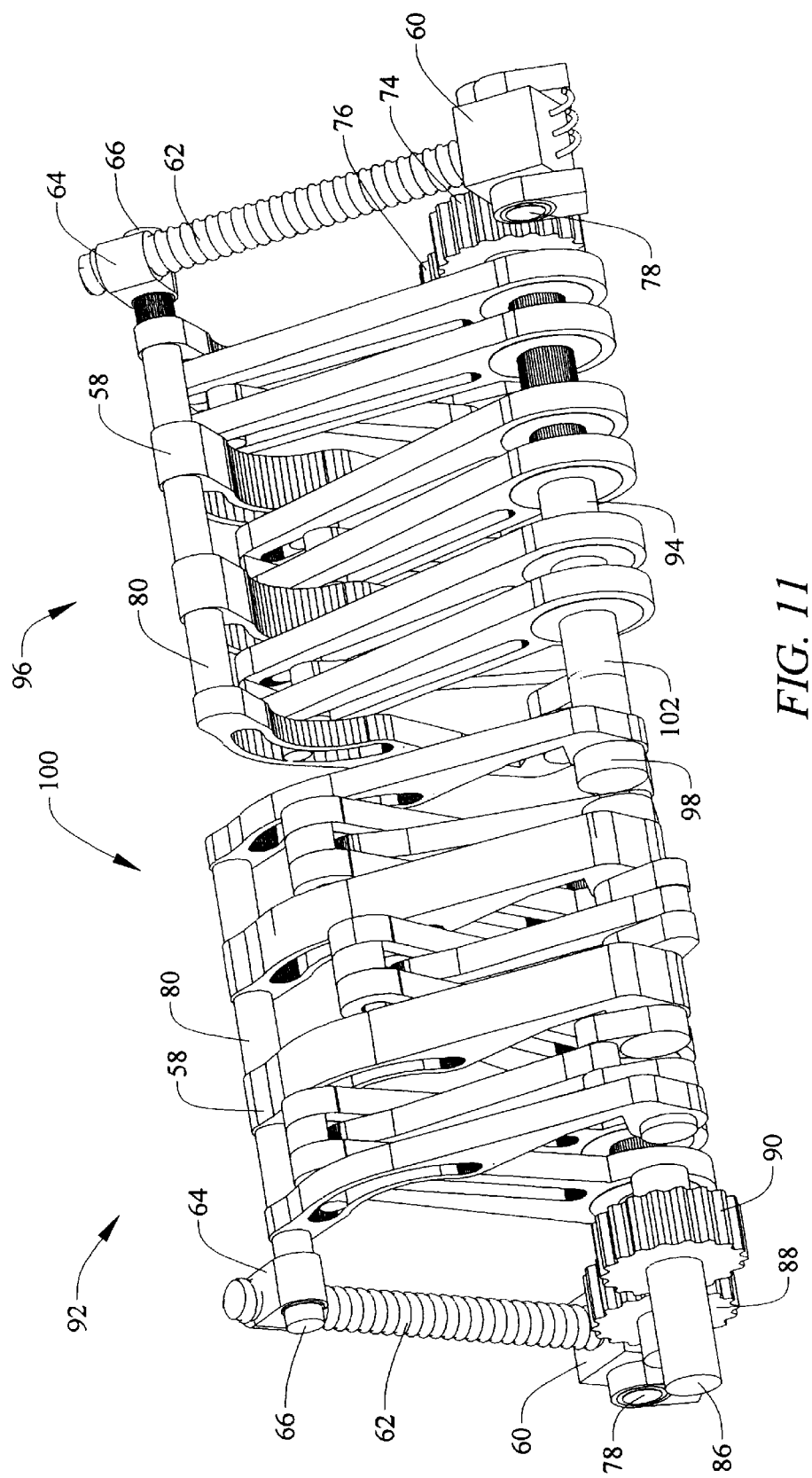
FIG. 11 presents a CVT having two of the transmissions shown in FIG. 10 coupled together wherein the transmission shaft of the first transmission is coupled directly to the lay shaft of the second transmission.

Referring now to FIG. 11, an alternate embodiment of a CVT 92 in accordance with aspects of the invention is shown. In this embodiment, two complete CVTs 57 as shown in FIG. 9 have been interconnected. The transmission shaft 94 of the first CVT 96 is directly connected to the lay shaft 98 of the second CVT 100. In a preferred embodiment, they are the same shaft 102. The two CVTs 96 and 100 are identical in all respects. In the embodiment shown, an input shaft (not shown) is connected through gears 74 and 76 to the lay shaft of the first CVT 96, in the same manner as shown in FIG. 9, and the transmission shaft of the second CVT 100 is connected through gears 88 and 90 to the output shaft 86 in the same way as shown in FIG. 9.

One result of the configuration of the CVT 92 shown in FIG. 11 is a much greater gearing ratio. Because the second CVT 100 provides a gearing ratio based on the output of the first CVT 96, which has already provided its own ratio, the resultant ratio is much greater than that provided by the single CVT 57 shown in FIG. 9. For example, if the first CVT 96 provided a three-to-one ratio, then combining that CVT with the identical second CVT 100 as shown in FIG. 11 would result in a nine-to-one ratio, all things being equal, resulting in increased performance of the vehicle in which the CVT 92 is mounted.

Figures 12, 13:
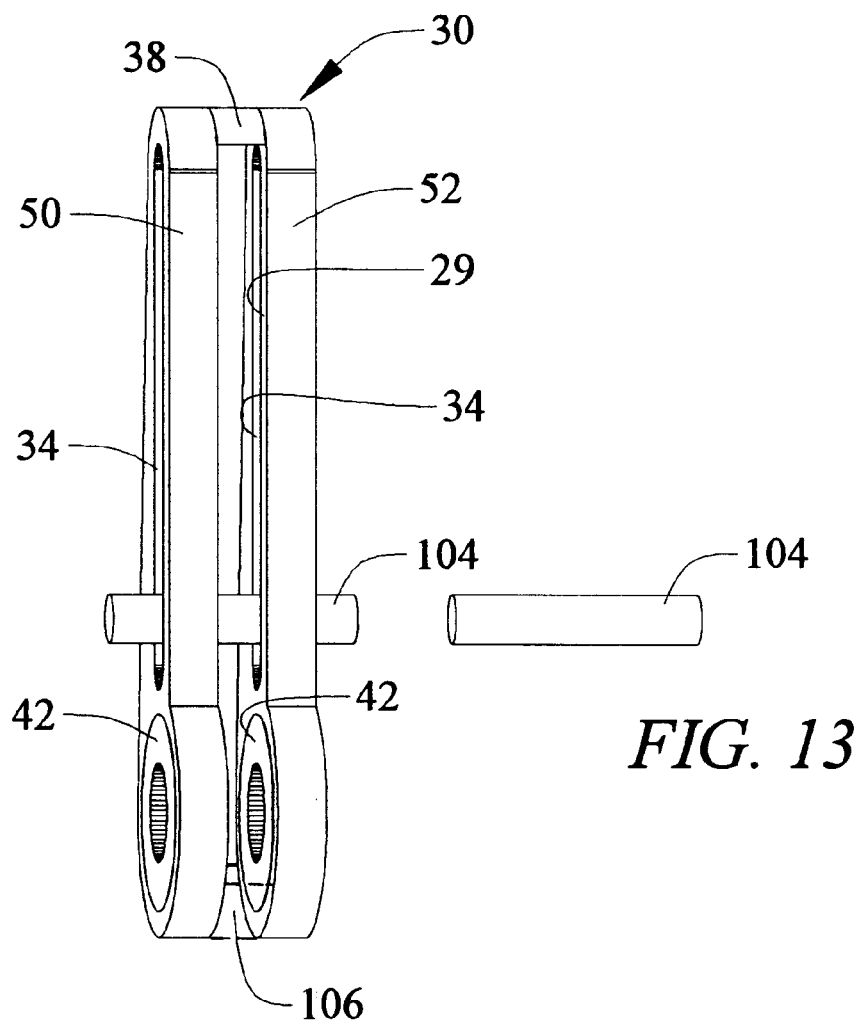
FIG. 12 is a front perspective view of the output rod of FIG. 3 showing the placement of a straight drive pin within the speed control slots.
FIG. 13 is a perspective view of the straight drive pin of FIG. 12 in which the pin comprises a straight shaft for connection to a drive rod at its center and connection to a speed control linkage at each end.

Another advantage of such a large increase in the gearing ratio by the arrangement shown in FIG. 11 is that straight drive pins may be used. Obtaining as large a ratio as possible from each CVT is not necessary due to the large ratio obtained by combining the two individual CVTs 96 and 100. Therefore, it is not necessary to move the drive pin to a position as close to the transmission shaft as possible which subjected the speed control linkage to the possibility of hitting the clutches. Instead, the drive pin need not be moved so close to the transmission shaft, and yet a large gearing ratio from the CVT 92 of FIG. 11 is still obtained. Referring now to FIGS. 12 and 13, a straight drive pin 104 is shown. As with the drive pin 32 of FIG. 5, a center section may be used for mounting to the respective drive rod and the outer pin sections may be used for engaging the speed control linkage (not shown).

Although the embodiment shown in FIG. 11 uses two separate actuators 60, lead screws 62, pivot pins 78, driver heads 64, linkage pins 66, and speed control linkage interconnect rods 80, and multiple speed control linkages 58, other arrangements are possible. For example, the two speed control linkage interconnect rods 80 of the separate CVTs may be interconnected through levers, gears, or other mechanical means so that only one actuator, lead screw, pivot pin, driver head, and linkage pin is needed. The single actuator would then control the positions of all the speed control linkages 58 of both CVTs. The CVTs could then remain oriented as shown in FIG. 11 and have the shaft 102 operating as the transmission shaft of one and the lay shaft of the other. In another example, the transmission shaft 94 of the first CVT 96 and the lay shaft 98 of the second CVT 100 may be coupled together through gears so that the two CVTs may be oriented in the same direction. In such case, a single speed control linkage interconnect rod 80 may control the positions of all speed control linkages 58 for both CVTs and then only one actuator, lead screw, pivot pin, driver head, and linkage pin would be needed.

In accordance with a CVT of the invention, the engine of the vehicle may be set to a particular RPM, such as 3,500 RPM, and the speed of the vehicle controlled by shifting the CVT. Moving a CVT control device, such as the gear shift lever 17 shown in FIG. 1, in one direction will result in the transmission shaft speed, and vehicle speed increasing while moving the CVT control device in the opposite direction will result in a decrease in speed. Thus, the driver of the vehicle need only be concerned with the speed of the vehicle and not the engine speed as the engine speed is kept substantially constant. This results in the engine being set at the most efficient speed where maximum horsepower, torque, and fuel efficiency exist. Additionally, an automatic shift CVT is also possible. The torque converter would permit the vehicle to come to a complete stop.

Details of connections between components and other structural details have not been provided as such are within the skill of those in the art. For example, the various components may be mounted together with bearings where needed. Support for the shafts can be provided. The CVT will likely need lubrication and such systems are known. Smoothing refinements are also well known. For example, the output rods may need counterweights opposite the elongated portion that links with the drive rod so that vibration is reduced. Such counterweights may be provided by the spacer 104 shown in dashed lines in FIG. 12, or by other means well known. Additional output rods may be used. For example, four output rods may be used in each transmission instead of three. The use of four output rods may have the effect of lessening the level of vibration. The fourth rod would be accompanied with an additional drive rod and other components, as shown above in the embodiments. As another example, the ends of the speed control linkage interconnect rods 80 opposite the driver head 64 may need structural support. Lubrication systems, balancing, and the choice, mounting, and use of bearings and other structural supports are all within the skill of those in the art and details are not provided here so that clarity is preserved.

Although specific embodiments of the invention have been described and illustrated, it is clear that the invention is susceptible to numerous modifications and embodiments within the ability of those skilled in the art, and without the exercise of inventive faculty. Thus, it should be understood that various changes in form, detail, and application of the present invention may be made without departing from the spirit and scope of the invention.

I claim:

1. A continuously variable transmission comprising:

a rotating lay shaft;

a crank disposed on the lay shaft and rotating with the lay shaft;

a transmission shaft;

a drive rod having a proximal end and a distal end, the drive rod mounted to the crank at the drive rod proximal end;

an output rod rotatably mounted at the transmission shaft and having a distal end and a plurality of linkage locations along the rod between the rotatable mounting location and the output rod distal end, the distal end of the drive rod being linked to the output rod at a linkage location, the linkage location of the distal end of the drive rod to the output rod controlling the speed of rotation of the output rod; and a one-way transmission device connecting the rotational movement of the output rod to the transmission shaft to thereby cause rotation of the transmission shaft.

2. The continuously variable transmission of claim 1 further comprising a speed control device connected to the distal end of the drive rod and adapted to control the linkage location of the drive rod to the output rod by moving the distal end of the drive rod to a selected location along the output rod to thereby control the speed of the rotational motion provided by the output rod.

3. The continuously variable transmission of claim 2 further comprising an actuator device that controls the position of the speed control device and thereby controls the selection of the linkage location at which the distal end of the drive rod and the output rod are linked.

4. The continuously variable transmission of claim 1 further comprising;
- a second rotating lay shaft coupled to the transmission shaft such that the second lay shaft rotates with rotation of the transmission shaft;
- a second crank disposed on the second lay shaft and rotating with the second lay shaft;
- a second transmission shaft that rotates in response to rotational motion;
- a second drive rod having a proximal end and a distal end, the second drive rod mounted to the second crank at the second drive rod proximal end;
- a second output rod rotatably mounted at the second transmission shaft and having a distal end and a plurality of linkage locations along the rod between the rotatable mounting location and the second output rod distal end, the distal end of the second drive rod being linked to the second output rod at a linkage location, the linkage location of the distal end of the second drive rod to the second output rod controlling the speed of rotation of the second output rod; and
- a second one-way transmission device connecting the rotational movement of the second output rod to the second transmission shaft to thereby cause rotation of the second transmission shaft.

5. The continuously variable transmission of claim 4 wherein the transmission shaft and the second lay shaft are formed of the same shaft.

6. The continuously variable transmission of claim 1 wherein the output rod comprises a drive slot within which the distal end of the drive rod is located to link with the output rod, the plurality of linkage locations of the distal end of the drive rod to the output rod occurring within the drive slot, wherein the linkage location of the distal end of the drive rod within the drive slot determining the speed of rotation of the output rod.

7. The continuously variable transmission of claim 6 further comprising a speed control device that selects the linkage location at which the distal end of the drive rod links to the drive slot of the output rod.

8. A method of transmitting input power with a continuously variable ratio of input power to output power, comprising:
- rotating a lay shaft having a crank in response to the input power;
- translating the rotational motion of the lay shaft into linear drive motion with a drive rod having a proximal end and a distal end, the proximal end being connected with the crank;
- linking the distal end of the drive rod to an output rod rotatably mounted at a transmission shaft, the output rod having a distal end and a plurality of linkage locations along the output rod between the rotatable mounting location and the output rod distal end at which the distal end of the drive rod is linked thereby translating the linear drive motion of the drive rod into a translated rotational drive motion at the transmission shaft;
- applying the translated rotational drive motion occurring in only a first direction to the transmission shaft thereby causing the transmission shaft to rotate in only one direction and provide output power; and
- controlling the ratio of the rotational drive motion to the rotational motion of the lay shaft by selecting a linkage location of the distal end of the drive rod to the output rod from the plurality of linkage locations along the output rod.

9. The method of transmitting power of claim 8 wherein the step of controlling the ratio comprises moving the distal end of the drive rod along the output rod to a selected location on the output rod.

10. The method of transmitting power of claim 9 further comprising controlling the ratio by moving the distal end of the drive rod along a drive slot formed within the output rod within which the distal end of the drive rod is located to link with the output rod, the plurality of linkage locations of the distal end of the drive rod to the output rod occurring within the drive slot, wherein the linkage location of the distal end of the drive rod within the drive slot determining the speed of drive rotation of the transmission shaft.

* * * * *